United States Patent Office 2,894,961
Patented July 14, 1959

2,894,961

ARYLHYDRAZONES OF 3,16α,17α-TRIHYDROXY-5-PREGNEN-20-ONE AND ESTERS THEREOF

Raymond M. Dodson, Park Ridge, Ill., assignor to G. D. Searle & Co., Chicago, Ill., a corporation of Illinois No Drawing. Application November 22, 1955
Serial No. 548,529

6 Claims. (Cl. 260—397.5)

The present invention relates to a new group of hydrazones, and is specifically concerned with arylhydrazones of 3,16α,17α-trihydroxy-5-pregnen-20-one and esters thereof. The compounds of this invention can be represented by the structural formula

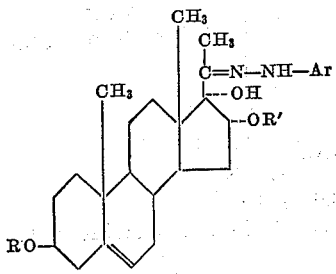

wherein R and R' are members of the group consisting of hydrogen and acyl radicals derived from lower alkanoic acids, and Ar is an aromatic hydrocarbon radical containing fewer than 10 carbon atoms. The group Ar can consequently represent such monocyclic, aromatic radicals as phenyl, tolyl, ethylphenyl, propylphenyl, xylyl, and trimethylphenyl. The terms R and R' in the foregoing structural representation include such acyl radicals as formyl, acetyl, propionyl, butyryl, valeryl, hexanoyl, heptanoyl, octanoyl, and branched-chain isomers thereof. These groups are acyl radicals derived from lower alkanoic acids containing fewer than 9 carbon atoms.

The compounds of this invention can be prepared by the reaction of 16α,17α-epoxy-3-hydroxy-5-pregnen-20-one or an ester thereof with an arylhydrazine and a lower alkanoic acid. The lower alkanoic acid serves the dual functions of a reagent for opening the epoxide ring and a solvent for the other reactants. For example, reaction of 16α,17α-epoxy-3β-hydroxy-5-pregnen-20-one of the structural formula

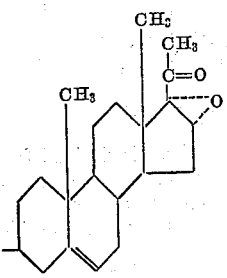

with phenylhydrazine in glacial acetic acid results in the addition of acetic acid to the epoxide ring and the formation of the phenylhydrazone of 16α-acetoxy-3β,17α-dihydroxy-5-pregnen-20-one. This compound can be converted to 3β,16α,17α-trihydroxy-5-pregnen-20-one and to other esters thereof by procedures described hereinafter. Reaction products in which R, R' and Ar represent various other groups can be conveniently obtained by a proper selection of starting materials. Thus, reaction of 3β-acetoxy-16α,17α-epoxy-5-pregnen-20-one with p-tolylhydrazine in propionic acid affords the p-tolylhydrazone of 3β-acetoxy-16α-propionoxy-17α-hydroxy-5-pregnen-20-one.

The compounds of the present invention are useful as chemical intermediates. In a copending application of Frank B. Colton, Serial No. 461,925, filed October 12, 1954, representative compounds of the present invention and their conversion to 16α,17α-dihydroxypregnen-20-one derivatives have been described. In addition, the arylhydrazones of this invention have valuable pharmacological properties and are potent hypotensive agents.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials in parts by weight.

*Example 1*

Under a nitrogen atmosphere a mixture of 725 parts of 16α,17α-epoxy-3β-hydroxy-5-pregnen-20-one, 796 parts of phenylhydrazine and 7600 parts of glacial acetic acid is permitted to stand at about 25° C. for 13 hours. The resulting precipitate is collected on a filter, washed with 67% acetic acid and purified by recrystallization from aqueous methanol. An additional quantity of product is obtained by concentration or dilution of the acetic acid liquor. The phenylhydrazone of 16α-acetoxy-3β,17α-dihydroxy-5-pregnen-20-one thus obtained melts with decomposition to an orange melt at about 222–223° C. This compound has the structural formula

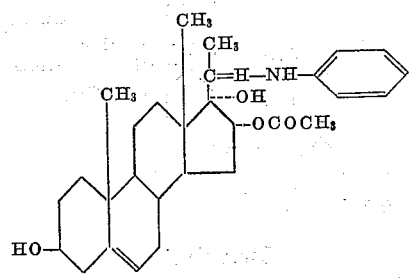

*Example 2*

A mixture of 50 parts of 16α,17α-epoxy-3β-hydroxy-5-pregnen-20-one, 62 parts of p-tolylhydrazine and 500 parts of propionic acid is allowed to stand in a nitrogen atmosphere at about 25° C. for 24 hours. The resulting precipitate is collected on a filter and washed. An additional quantity of product is obtained by dilution of the propionic acid liquor. This compound is the p-tolylhydrazone of 16α-propionoxy-3β,17α-dihydroxy-5-pregnen-20-one having the structural formula

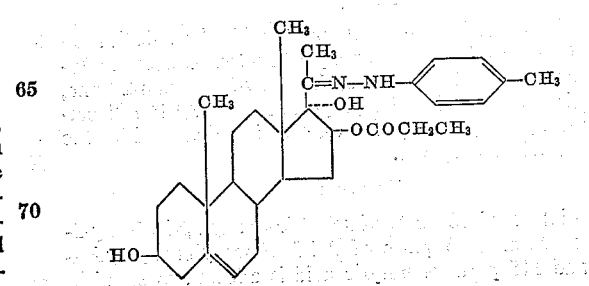

Example 3

A solution of 200 parts of the phenylhydrazone of 16α-acetoxy-3β,17α-dihydroxy-5-pregnen-20-one, 1600 parts of methanol and 200 parts of sodium methoxide is heated at the boiling point in an open reaction vessel for 30 minutes. The mixture is then diluted with water until it becomes cloudy, and allowed to cool. The precipitated product is collected on a filter and washed with water. Recrystallization from a mixture of acetone and cyclohexane affords white crystals of the phenylhydrazone of 3β,16α,17α-trihydroxy-5-pregnen-20-one, melting with decomposition to a yellow melt at about 208.5–209.5° C. This compound has the structural formula

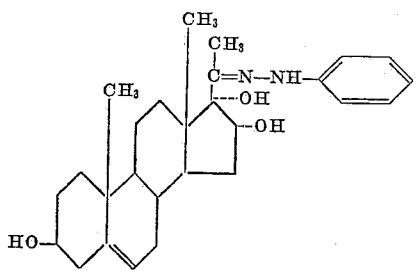

Example 4

A mixture of 1 part of the phenylhydrazone of 16α-acetoxy-3β,17α-dihydroxy-5-pregnen-20-one, 50 parts of pyridine and 55 parts of acetic anhydride is maintained at about 25° C. for 15 hours and then diluted with ice water. The precipitated product is collected on a filter and purified by recrystallization from aqueous methanol. The phenylhydrazone of 3β,16α-diacetoxy-17α-hydroxy-5-pregnen-20-one thus obtained melts with decomposition at about 216–217° C. The ultraviolet absorption spectrum shows a maximum at 273.5 millimicrons with a molecular extinction coefficient of 23,500. This compound has the structural formula

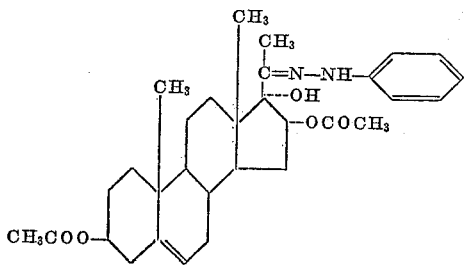

Example 5

A solution of 2.7 parts of the phenylhydrazone of 3β,16α,17α-trihydroxy-5-pregnen-20-one, 100 parts of pyridine and 105 parts of acetic anhydride is allowed to stand at about 25° C. for 15 hours. It is diluted with ice water until precipitation of the reaction product is complete. This product is collected on a filter, washed with water and purified by repeated crystallizations from aqueous methanol. In this manner there is obtained the phenylhydrazone of 3β,16α-diacetoxy-17α-hydroxy-5-pregnen-20-one, identical with the product of Example 4.

Example 6

By the procedure of Example 1, with the substitution of 820 parts of 16α,17α-epoxy-3β-acetoxy-5-pregnen-20-one for the 16α,17α-epoxy-3β-hydroxy-5-pregnen-20-one, there is obtained the phenylhydrazone of 3β,16α-diacetoxy-17α-hydroxy-5-pregnen-20-one, identical with the product of Example 4.

Example 7

A mixture of 10 parts of 16α,17α-epoxy-3β-hydroxy-5-pregnen-20-one, 15 parts of 2,4,5-trimethylphenylhydrazine and 115 parts of butyric acid is allowed to stand in a nitrogen atmosphere at about 25° C. for 48 hours. Water is then added and, when separation of the insoluble product is complete, it is collected on a filter and washed with dilute acetic acid and then with water. This product is the 2,4,5-trimethylphenylhydrazone of 16α-butyroxy-3β,17α-dihydroxy-5-pregnen-20-one.

Example 8

A solution of 3.5 parts of the 2,4,5-trimethylphenylhydrazone of 16α-butyroxy-3β,17α-dihydroxy-5-pregnen-20-one, 100 parts of pyridine and 50 parts of propionic anhydride is allowed to stand at about 25° C. for 2 hours. It is diluted with ice water and, when separation of the product is complete, it is collected on a filter and washed with water. This product is the 2,4,5-trimethylphenylhydrazone of 16α-butyroxy-17α-hydroxy-3β-propionoxy-5-pregnen-20-one of the structural formula

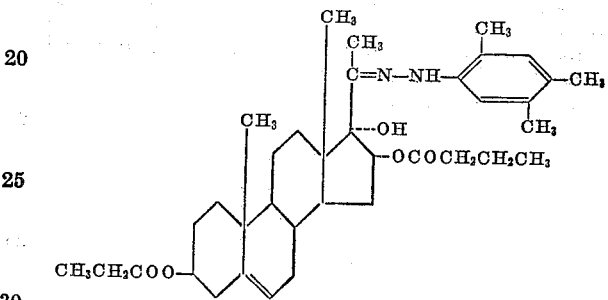

What is claimed is:

1. A compound of the structural formula

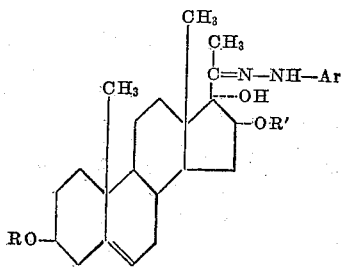

wherein the acyl radical is derived from a lower alkanoic hydrogen and acyl radicals derived from lower alkanoic acids, and Ar is an aromatic hydrocarbon radical containing fewer than 10 carbon atoms.

2. A compound of the structural formula

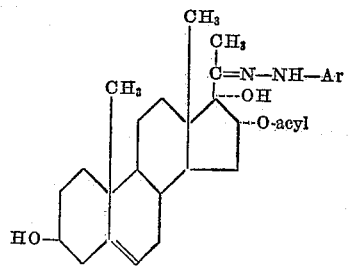

wherein the acyl radical is derived from a lower alkanoic acid, and Ar is an aromatic hydrocarbon radical containing fewer than 10 carbon atoms.

3. A compound of the structural formula

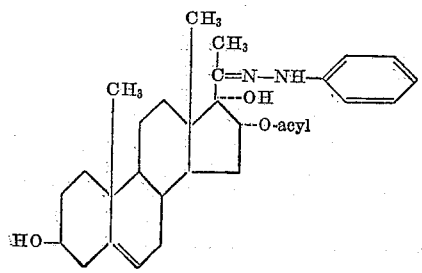

wherein the acyl radical is derived from a lower alkanoic acid.

4. Phenylhydrazone of 16α-acetoxy-3β,17α-dihydroxy-5-pregnen-20-one.

5. Phenylhydrazone of 3β,16α-diacetoxy-17α-hydroxy-5-pregnen-20-one.

6. Phenylhydrazone of 3β,16α,17α-trihydroxy-5-pregnen-20-one.

References Cited in the file of this patent
UNITED STATES PATENTS

| | | |
|---|---|---|
| 2,727,909 | Colton | Dec. 20, 1955 |
| 2,808,399 | Dodson | Oct. 1, 1957 |